(12) United States Patent
Conway et al.

(10) Patent No.: US 6,854,002 B2
(45) Date of Patent: Feb. 8, 2005

(54) EFFICIENT INTERPOLATOR FOR HIGH SPEED TIMING RECOVERY

(75) Inventors: Thomas Conway, County Offaly (IE); Jason Byrne, Longmont, CO (US)

(73) Assignee: STMicroelectronics NV (NL)

(*) Notice: Subject to any disclaimer, the term of this patent is extended or adjusted under 35 U.S.C. 154(b) by 0 days.

(21) Appl. No.: 10/439,401

(22) Filed: May 16, 2003

(65) Prior Publication Data

US 2003/0182335 A1 Sep. 25, 2003

Related U.S. Application Data

(62) Division of application No. 09/387,104, filed on Aug. 31, 1999, now Pat. No. 6,591,283.
(60) Provisional application No. 60/113,857, filed on Dec. 24, 1998, and provisional application No. 60/113,837, filed on Dec. 24, 1998.

(51) Int. Cl.[7] .......................... G06F 17/17; G06F 17/10
(52) U.S. Cl. ..................... 708/313; 708/316; 708/319
(58) Field of Search ............................. 708/313, 316, 708/319

(56) References Cited

U.S. PATENT DOCUMENTS

| | | |
|---|---|---|
| 4,726,067 A | 2/1988 | Alonso |
| 4,847,701 A | 7/1989 | Suesada |
| 4,866,647 A | 9/1989 | Farrow |
| 5,050,119 A | 9/1991 | Lish |
| 5,204,827 A | 4/1993 | Fujita et al. |
| 5,696,639 A | 12/1997 | Spurbeck et al. |
| 5,726,818 A | 3/1998 | Reed et al. |
| 5,760,984 A | 6/1998 | Spurbeck et al. |
| 5,796,535 A | 8/1998 | Tuttle et al. |
| 5,812,336 A | 9/1998 | Spurbeck et al. |
| 5,892,632 A | 4/1999 | Behrens et al. |
| 6,032,171 A | 2/2000 | Kiriaki et al. |
| 6,035,320 A * | 3/2000 | Kiriaki et al. |
| 6,275,836 B1 | 8/2001 | Lu |
| 6,529,926 B1 * | 3/2003 | Capofreddi |

OTHER PUBLICATIONS

Oppenheim, A.V., et al., Signals and Systems, Prentice–Hall Signal Processing Series, pp. 515–519, 1983.
Gardner, F.M., Interpolation in Digital Modems—Part I: Fundamentals, *IEEE Transactions on Communications*, 41(3), Mar. 1993.
Gardner, F.M., Interpolation in Digital Modems—Part II: Implementation and Performance, *IEEE Transactions on Communications*, 41(6), Jun. 1993.

* cited by examiner

Primary Examiner—Tan V. Mai
(74) Attorney, Agent, or Firm—Lisa K. Jorgenson; Steven H. Slater

(57) ABSTRACT

A data processing circuit includes a digital data source having an output carrying a sequence of digital signals. A pre-filter is coupled to the output of the digital data source. The pre-filter has a first output that carries a second sequence of digital signals and a second output that carries a third sequence of digital signals. The second sequence of digital signals is time shifted relative to the third sequence of digital signals. The circuit also includes an interpolation circuit with a first input coupled to the first output of the pre-filter and a second input coupled to the second output of the pre-filter.

16 Claims, 3 Drawing Sheets

EFFICIENT INTERPOLATOR FOR HIGH SPEED TIMING RECOVERY

This application is a divisional of U.S. patent application Ser. No. 09/387,104 filed Aug. 31, 1999 now U.S. Pat. No. 6,591,283, which claims the benefit of U.S. Provisional Application Ser. No. 60/113,857 filed Dec. 24, 1998 and also to U.S. Provisional Application Ser. No. 60/113,837 filed Dec. 24, 1998, which applications are incorporated herein by reference.

REFERENCE TO RELATED APPLICATION

This application is related to commonly assigned, application Ser. No. 09/387,146 (99-AD-081) now U.S. Pat. No. 6,487,672, which application is incorporated herein by reference.

FIELD OF THE INVENTION

This invention relates generally to digital signal processing devices and specifically to an efficient interpolator for high speed timing recovery.

BACKGROUND OF THE INVENTION

In most communication and storage systems, timing (or clocking) information is extracted from the received signal. This recovered timing information is often used to resample the received signal such that the detector in such a system can operate on samples that are synchronous to the data being received. This recovery is often achieved using a sampling device, such as an analog-to-digital converter (ADC) or a sample and hold (S/H) circuit.

Both the ADC and the S/H circuit use a reclocking signal to sample a continuous waveform. The clock input of such a system is usually obtained from a voltage controlled oscillator (VCO). The input signal controlling the VCO frequency can be used to change the point on the continuous waveform.

In digital systems it is often desirable to sample the signal with an asynchronous clock and use digital signal processing to process the signal and recover the timing information. Such a system is described in papers by Gardner. Floyd M. Gardner, "Interpolation in Digital Modems-Part I: Fundamentals, IEEE Transactions on Communications, 41(6), June 1993, and Floyd M. Gardner, "Interpolation in Digital Modems-Part II: Implementation and Performance, IEEE Transactions on Communications, 41(6), June 1993.

The use of digital signal processing avoids the requirement of analog components in the timing recovery loop. Also digital processing, such as equalization, can be achieved before the timing information is recovered.

An important function of such a digital timing recovery system is a variable interpolator. This function produces an output signal which is a time shifted version of the input signal. The time shift is determined from a programmable input which in a timing recovery application may be required to change on a sample to sample basis. In particular, a frequency be achieved by having a continuously varying time delay on the input.

FIG. 1 shows a block diagram of an interpolator 10. Interpolator 10 receives a sequence of input signals X(kT) and time shifts this sequence by a time $\tau_k$. The output of interpolator 10 provides a sequence of signals Y(kT−LT+$\tau_{k-m}$). In practice the time shift input $\tau_k$ can adjust the delay over a limited range, usually one sample period T. Typically $0 \leq \tau < T$ or $-T/2 \leq \tau < T/2$.

A basic discrete time interpolation function can be implemented as shown in FIG. 2. The interpolator 10 includes a finite impulse response (FIR) filter 12 and a read only memory (ROM) 14.

FIR filter 12 receives input sequence $X_k$, which is applied to a group of serially coupled delay elements 16. Each delay element 16 provides an output that is one clock cycle delayed from its input. The timed sequence of signals X is provided to each of a number of multipliers 18. The multipliers receive a second input from ROM 14 and provide the results to summer (or adder) 20. The output of summer 20 is the sequence of signals $Y_k$.

In operation, the time shifting is achieved by FIR filter 12. In order to provide a time shift to the input signal, the coefficients of the filter 12 should be a sinc function. In particular, for a time shift of τ the coefficients $h_k$ should be $$h_k = \text{sinc}(k+\tau) \text{ where } k=-\infty, \ldots, -1, 0, 1, \ldots, \infty$$

where the sinc function is defined as $$\text{sinc}(x) = \sin(\pi x)/\pi x.$$

While an ideal interpolator response extends over an infinite length of time, in practice, the filter length will be truncated to a practical length. This can be achieved in particular when the system is oversampled or the energy in the signal is not spread equally over the whole signal band.

The coefficients of the filter change depending on the required time shift τ and may be calculated or looked up in a lookup table implemented by read only memory 14. FIG. 2 shows a ROM based lookup table. In this case, the number of possible values of τ is limited by the size of the ROM 14.

Recently a cost reduced interpolation scheme has been described in U.S. Pat. No. 5,760,984 issued Jun. 2, 1998 and entitled "Cost Reduced Interpolated Timing Recovery in a Sampled Amplitude Read Channel," incorporated herein by reference. This interpolator uses three parallel prefilters and a three-tap interpolator.

SUMMARY OF THE INVENTION

In one aspect, the present invention provides an efficient implementation of an interpolation system that could be used in high speed timing recovery systems. The interpolator is intended for use in such systems as sampled magnetic recording read channels but may also be used in other high speed digital storage and communications channels, where sampling at close to, or equal to, the baud rate is required.

In a first aspect, the present invention discloses an interpolation circuit that includes n multipliers. Each multiplier receives inputs from a coefficient memory and a select circuit. The select circuit receives its inputs from a plurality of input nodes. These input nodes are taken from a digital data stream, possibly after some prefiltering. The select circuit is configured so that at a first time each of the input nodes is coupled to a respective one of the output nodes of the select circuit and such that at a second time at least some of the input nodes are coupled to a different one of the output nodes of the select circuit. In some embodiments, inclusion of the select circuit allows the size of the coefficient memory to be reduced.

In another aspect, the present invention provides a data processing circuit that can be used, for example, in a data recovery scheme. A digital data source outputs a sequence of digital signals. These digital signals are spaced by a time period. A pre-filter receives the digital signals and provides a second sequence of digital signals. The second sequence of digital signals is spaced by a second time period that is smaller than the first time period. An interpolation circuit receives the second sequence of digital signals and can operate on them. In one aspect, the interpolation circuit operates on five input signals at a time but does so with less than five multipliers.

The quality of an interpolator as disclosed here can be judged by a number of properties. For example, accuracy provides an indication of how closely the implementation matches an ideal interpolator. Another factor is latency. When used in a timing recovery loop, the loop acts to change the timing phase of the interpolator based on the output samples. Therefore, it is important to minimize the time delay (latency) between changing the time shift input and the output samples reflecting this change to improve the stability of the loop.

It is also desirable to minimize the complexity of the interpolator implementation to allow small area and power dissipation when implemented in hardware. It is also desirable to achieve an implementation that allows high speed operation. The speed factor is especially important in magnetic recording applications where high speed is required where the signal may be sampled at or close to the baud rate of the signal.

The interpolation scheme of the present invention provides advantages in each of these areas. For example, the latency and speed of the circuit is improved. Since the interpolator requires fewer multipliers and adders, the delay between the input and output is reduced. In addition, the ROM complexity is significantly reduced allowing for faster operation.

The complexity of the system is also reduced because of the reduced number of multipliers and adders in the interpolation section. The lower complexity results in lower power and smaller area in an integrated circuit implementation.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

The present invention provides an efficient interpolation implementation that can be utilized in a number of environments. The preferred embodiment will be described first. Variations of this first embodiment will then be discussed. Finally, one example of a system implementation will be described. In particular, the interpolation circuit of the present invention will be described in the context of a read channel of a storage medium, such as a hard disk drive.

Figure 1:
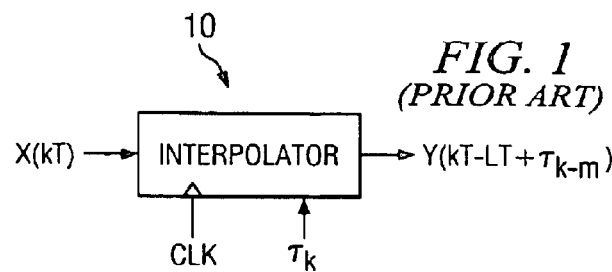
FIG. 1 is a block diagram of an ideal interpolator.
Figure 2:
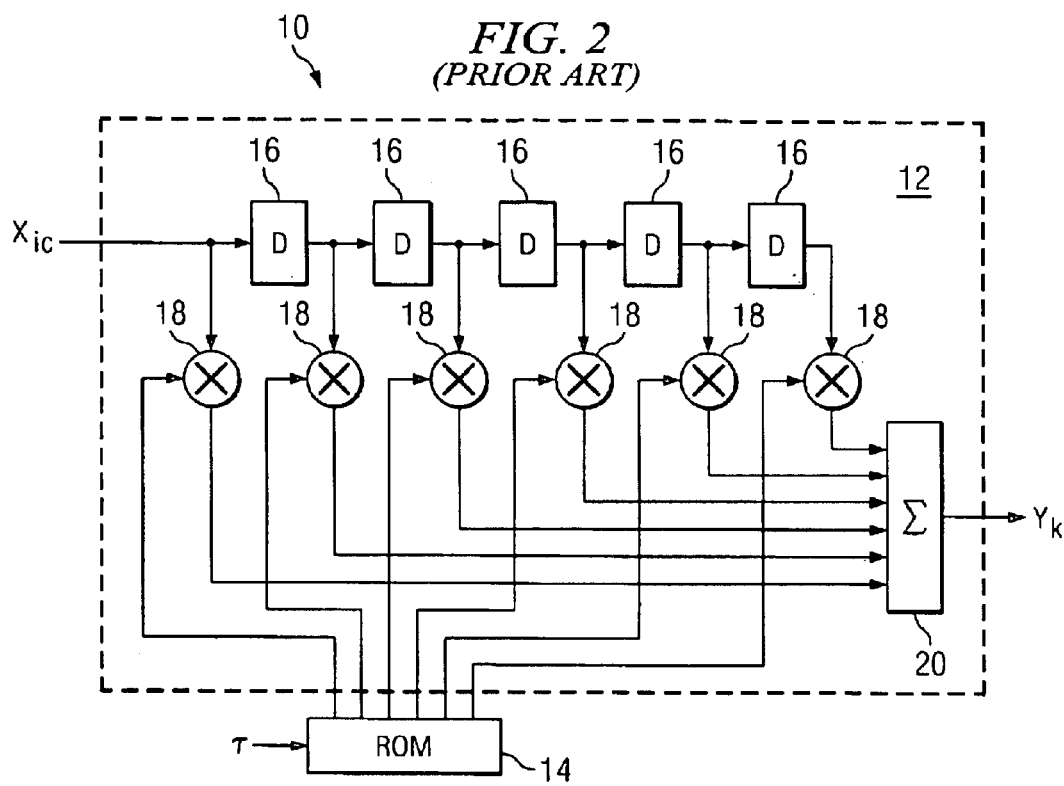
FIG. 2 is a block diagram of a known implementation of an interpolator.
Figure 3:
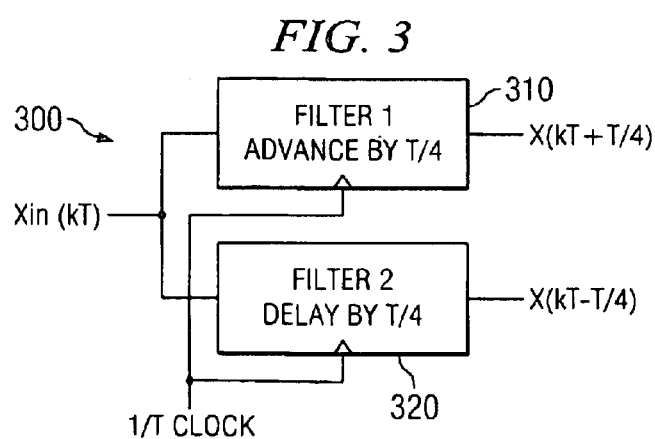
FIG. 3 is a block diagram of a prefilter of the present invention.
Figure 4:
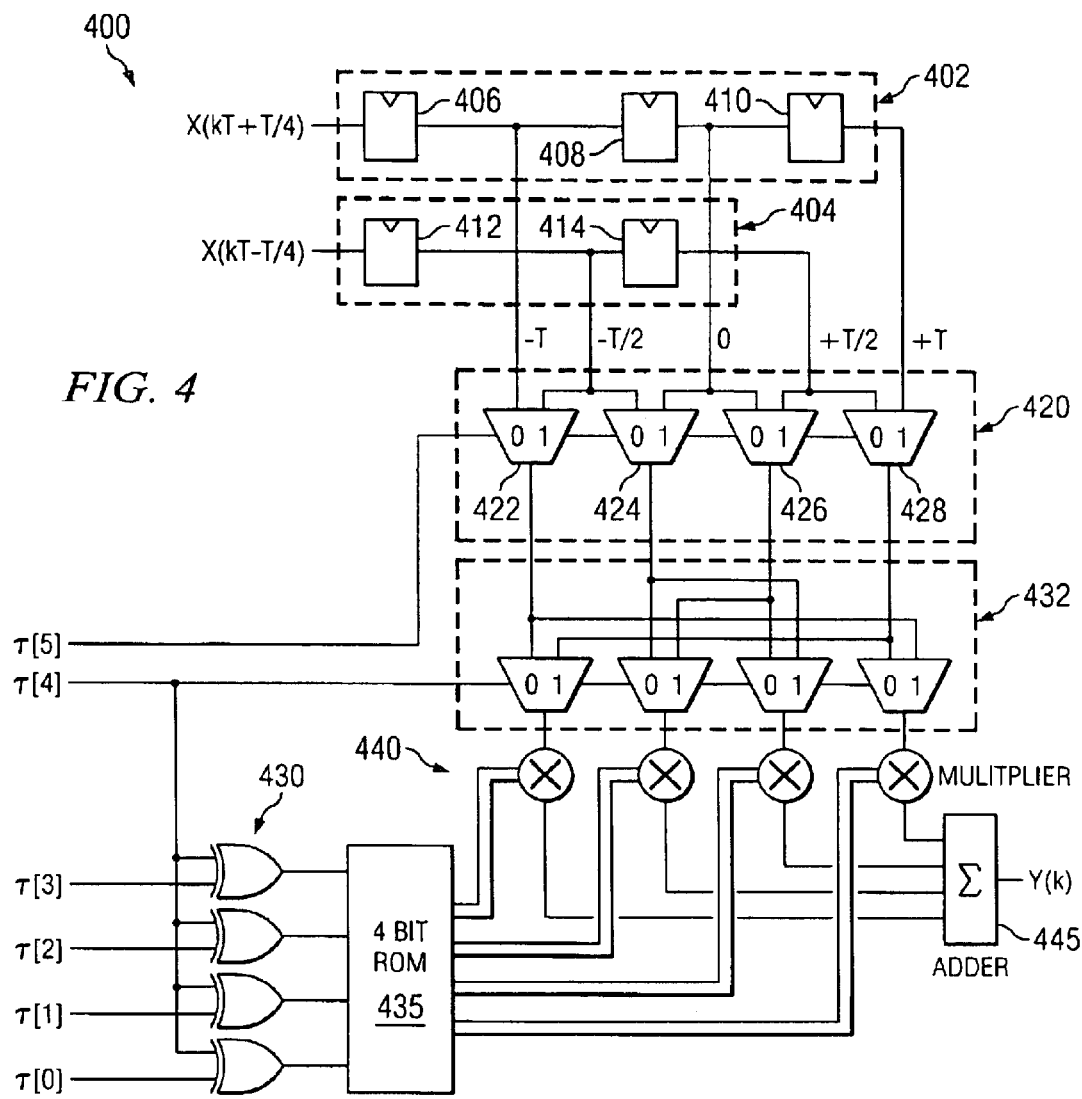
FIG. 4 is a block diagram of an interpolator of the present invention.

FIGS. 3 and 4 show a preferred embodiment interpolator structure. The system is split into two parts, the prefiltering section 300 (FIG. 3) and the interpolator section 400 (FIG. 4). The prefilter 300 includes two parallel banks of FIR filters 310 and 320. Both filters 310 and 320 are clocked at the rate 1/T, where T is the time period between signals.

The input $X_{in}(kT)$ is applied to both filters 310 and 320. The filters 310 and 320 are designed such that filter 310 provides an advance of the signal by T/4 while the other filter 320 provides a delay of the signal by T/4. It is also noted that to realize such filters, they will both have an integer delay, which is of no consequence to the system operation.

In this implementation, at each clock cycle, there are two samples available. These two samples are spaced T/2 seconds apart. By having the samples spaced closer together than T, the interpolation function can be implemented more easily.

The coefficients of the prefilters 310 and 320 can be calculated by using a least mean squares approach with the expected power spectral density of the signal being interpolated. The coefficients $h^1_k$ for filter 310 can be calculated as $$h^1_k = \{-0.0440, +0.0593, -0.1427, +0.3266, +1.0000, -0.1961, +0.0742, -0.0502\}.$$

Since as filter 310 has an advance of +T/4 and filter 320 has a delay of -T/4, filter 320 can be calculated as the time reversed coefficient and hence $$h^2_k = \{-0.0502, +0.0742, -0.1961, +1.0000, +0.3266, -0.1427, +0.0593, -0.0440\}.$$

The new interpolator structure is shown in FIG. 4. The two samples X(kT+T/4) and X(kT−T/4) from the prefilters 310 and 320 are clocked into two banks of registers 402 and 404. The register banks 402 and 404 each include a number of serially coupled delay elements 406–414. In the illustrated embodiment, register bank 402 includes three delay elements 406, 408 and 410, each coupled in a serial fashion so that the output of one element is coupled to the input of an adjacent element. In this embodiment, register bank 404 includes two delay elements 412 and 414, which are also coupled serially.

When the outputs from the registers 402 and 404 are taken as shown in FIG. 4, at a given clock instant, five samples of the input signal $X_{in}(kT)$ are available. These samples are delayed by relative of {−T, −T/2, 0, +T/2, +T}. It is noted that time delays here have been renormalized, since the T/4 time shift has been neglected. The shifting of a time constant will not affect the operation of the circuit since the interpolator compensates for these.

The delay shift required by the interpolator is defined by the value of τ[5:0], which is a 6 bit number in this example. The value of τ[5:0] represents the time shifts as shown in Table 1.

TABLE 1

| τ[5:0] | Time Shift |
|---|---|
| 000000 | −63/128 T |
| 000001 | −61/128 T |
| 000010 | −59/128 T |
| 000011 | −57/128 T |
| * | * |
| * | * |
| * | * |
| 011111 | −1/128 T |
| 100000 | +1/128 T |
| 100001 | +3/128 T |
| * | * |
| * | * |
| * | * |
| 111110 | +61/128 T |
| 111111 | +63/128 T |

From the table, it can be seen that if the most significant bit (MSB) of τ[5:0] is 0, then the phase shift is negative and the interpolation may be achieved by using the register outputs labeled {−T, −T/2, 0, +T/2}. Similarly, when the MSB is 1, the interpolation can be achieved using the register outputs labeled {−T/2, 0, +T/2, +T}.

Elimination of one of the input signals can be accomplished using a select circuit 420. In this example, the select circuit 420 includes four serially coupled multiplexers 422–428. As a result, this select circuit implementation can be referred to as a multiplexer row 420. Other embodiments may use other circuits.

This multiplexing operation uses the MSB of τ[5:0], i.e., τ[5], as a selector between the signal group with signals labeled {−T, −T/2, 0, +T/2} and the signal group with signals labeled {−T/2, 0, +T/2, +T}. After the selection, this bit T[5] is not required any further. The interpolation task is then reduced to interpolating between four samples using bits T[4:0].

Figure 5:
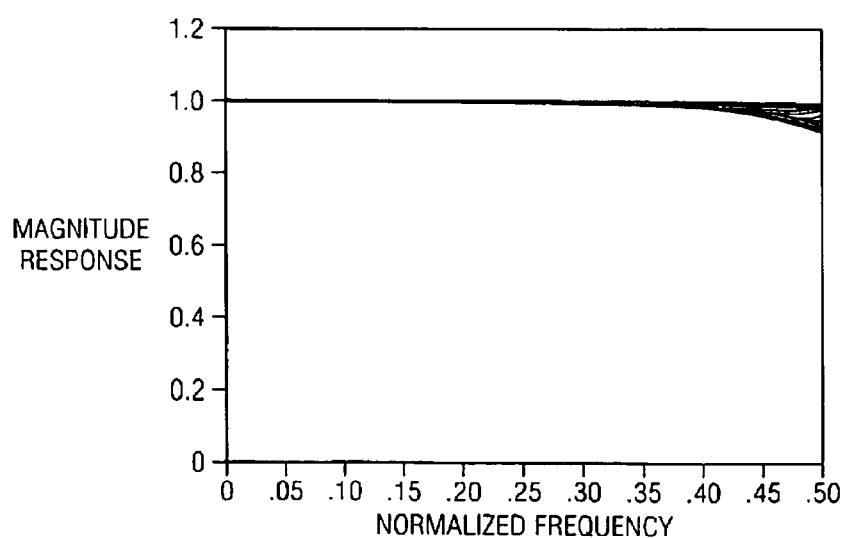
FIG. 5 is a diagram showing a four-tap interpolator magnitude response in the Nyquist band.

As an example, for the four tap interpolator, the coefficients $h_k(x)$, stored in ROM 435, can be calculated for a shift $0 \leq x \leq 1.0$ by $$h_k(x) = \text{sinc}(k-2-x) \times \text{hanning}(4), \text{ where } k=1, 2, 3, 4$$

where hanning(4) is a hanning window of length 4. Table 2 tabulates the coefficients when the filter coefficients are normalized such that the summation of $h_1(x)$, $h_2(x)$, $h_3(x)$, and $h_4(x)$ is one. FIG. 5 shows the magnitude response of each of the thirty-two filter coefficients over the Nyquist band 0<f<1/T.

TABLE 2

| τ[4:0] | τ[4:0] | $h_1$ | $h_2$ | $h_3$ | $h_4$ |
|---|---|---|---|---|---|
| 0 | 00000 | −0.0063 | 0.9938 | 0.0158 | −0.0032 |
| 1 | 00001 | −0.0182 | 0.9797 | 0.0482 | −0.0097 |
| 2 | 00010 | −0.0289 | 0.9635 | 0.0817 | −0.0162 |
| 3 | 00011 | −0.0356 | 0.9452 | 0.1161 | −0.0226 |
| 4 | 00100 | −0.0472 | 0.9249 | 0.1513 | −0.0290 |
| 5 | 00101 | −0.0548 | 0.9026 | 0.1873 | −0.0352 |
| 6 | 00110 | −0.0614 | 0.8786 | 0.2240 | −0.0411 |
| 7 | 00111 | −0.0671 | 0.8529 | 0.2611 | −0.0469 |
| 8 | 01000 | −0.0718 | 0.8255 | 0.2986 | −0.0524 |
| 9 | 01001 | −0.0755 | 0.7967 | 0.3364 | −0.0575 |
| 10 | 01010 | −0.0784 | 0.7664 | 0.3743 | −0.0623 |
| 11 | 01011 | −0.0805 | 0.7349 | 0.4123 | −0.0667 |
| 12 | 01100 | −0.0817 | 0.7022 | 0.4501 | −0.0706 |
| 13 | 01101 | −0.0821 | 0.6684 | 0.4878 | −0.0740 |
| 14 | 01110 | −0.0818 | 0.6337 | 0.5251 | −0.0769 |
| 15 | 01111 | −0.0808 | 0.5981 | 0.5619 | −0.0792 |
| 16 | 10000 | −0.0792 | 0.5619 | 0.5981 | −0.0808 |
| 17 | 10001 | −0.0769 | 0.5251 | 0.6337 | −0.0818 |
| 18 | 10010 | −0.0740 | 0.4878 | 0.6684 | −0.0821 |
| 19 | 10011 | −0.0706 | 0.4501 | 0.7022 | −0.0817 |
| 20 | 10100 | −0.0667 | 0.4123 | 0.7349 | −0.0805 |
| 21 | 10101 | −0.0623 | 0.3743 | 0.7664 | −0.0784 |
| 22 | 10110 | −0.0575 | 0.3364 | 0.7967 | −0.0755 |
| 23 | 10111 | −0.0524 | 0.2986 | 0.8255 | −0.0718 |
| 24 | 11000 | −0.0469 | 0.2611 | 0.8529 | −0.0671 |
| 25 | 11001 | −0.0411 | 0.2240 | 0.8786 | −0.0614 |
| 26 | 11010 | −0.0352 | 0.1873 | 0.9026 | −0.0548 |
| 27 | 11011 | −0.0290 | 0.1513 | 0.9249 | −0.0472 |
| 28 | 11100 | −0.0226 | 0.1161 | 0.9452 | −0.0386 |
| 29 | 11101 | −0.0162 | 0.0817 | 0.9635 | −0.0289 |
| 30 | 11110 | −0.0097 | 0.0482 | 0.9797 | −0.0182 |
| 31 | 11111 | −0.0032 | 0.0158 | 0.9938 | −0.0063 |

From the table 2, it can be seen that there is symmetry between the first and second half of the table. This property can be used to halve the table size required. In particular, a table look up of four bits τ[3:0] is all that is required. If τ[4:0]<16, i.e., τ[4]=0, then the 4-bit table can be looked up using τ[3:0] to find the multiplier coefficients. If τ[4:0]>15, i.e., τ[4]=1, then the required multiplier coefficients can be calculated by inverting the four bits τ[3:0] before the table look up and reversing the order of the coefficients.

As an example, consider calculating the multiplier coefficients for τ[4:0]=23. The binary representation of τ[4:0] is 10111. Inverting [3:0] yields 1000, which is the binary representation of the decimal number eight. The table lookup of location 8 yields the coefficients {−0.0718, 0.8255, 0.2986, −0.0524}. When these entries are reversed, the coefficients {−0.0524, 0.2986, 0.8255, −0.0718} are yielded. Referring back to Table 2, these coefficients are the same as the coefficients found in the row where τ[4:0]=23.

FIG. 4 illustrates one example of how the reduced entry lookup table can be implemented. The bit τ[4] is used to invert the lower bits τ[3:0] when τ[4]=1. This inversion can be accomplished, for example, using the XOR gates 430. Instead of reversing the coefficients, the inputs to the multipliers 440 are reversed using select circuit 432. In this example, select circuit 432 is a multiplexer row.

When the select input τ[4]=1, the select circuit input nodes (taken from select circuit 420) reverses the order of the input nodes. This function allows the multiplying to be done while, at the same time, the lookup is being done. This technique therefore reduces the overall delay in the calculation. Also the multiplier ranges can be reduced because of the limited range of the coefficients.

Figure 6:
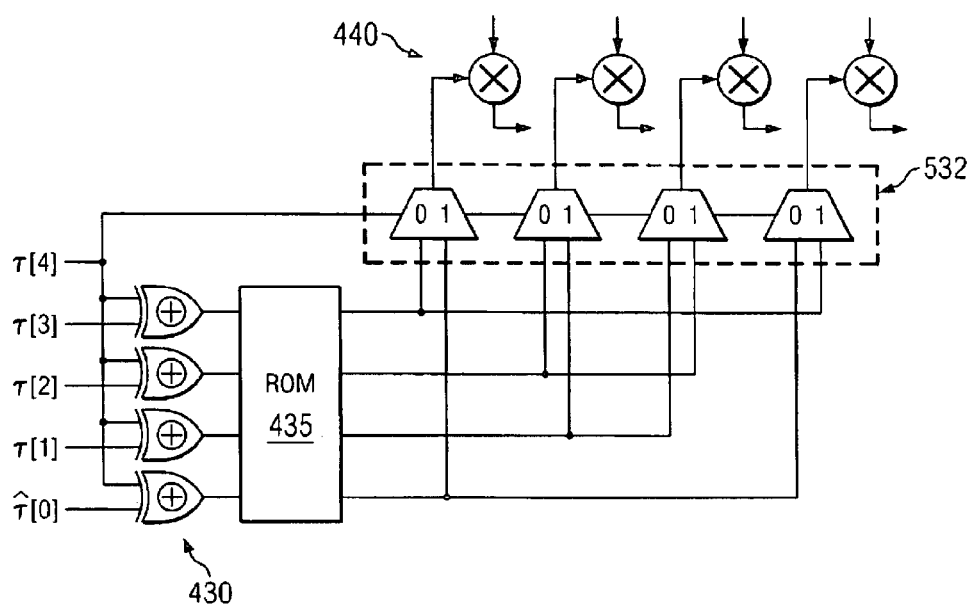
FIG. 6 is a block diagram showing a modification that could be made to the interpolator of FIG. 4.

In an alternative embodiment, shown in FIG. 6, the select circuit 532 is provided between ROM 435 and multipliers 440. In this embodiment, the coefficients are reversed instead of the inputs.

In other embodiments, the coefficient table may have other features of symmetry. For example, in some embodiments the table entry for [4:0]=0 would have coefficients {0, 0, 1, 0, 0}. In a table such as this, the center of symmetry would be around the sixteenth entry rather than between entries fifteen and sixteen (as in Table 2). An alternative construction table like this would have no time shift for the first entry, i.e., simply passing the signal at time 0 (and multiplying the signals at time −T, −T/2, +T/2, and +T by zero). The remaining entries in the coefficient table would exhibit the same symmetry as shown in Table 2 above.

In that case, the same concepts can be utilized. As before, when τ[4]=1 the remaining portion of the time shift τ[3:0]

would be inverted but now one would be added to the result. This result could then be used as the address to the ROM. It is noted that the entry for 16 (binary 10000) will need to be handled specially since inversion of τ[3:0] leads to 1111. Addition of one, leads to 10000, which is correct but indicates that another table entry is required. It is also noted that the ROM address selection circuitry 435 would be more complicated than the four XOR gates shown in FIG. 4.

Another way to accomplish this implementation would be to remove the τ[4:0]=0 entry from the ROM and generate the coefficients with logic. Logic could then be applied to the τ[3:0] bits to correctly access the remaining entries.

Returning to FIG. 4, the outputs of select circuit 432 are applied to respective inputs of the multipliers 440. These multiplier inputs are multiplied with the coefficients retrieved from ROM 435. The products are then added together in summer (or adder) 445. The result from adder 445 is the interpolator output sequence Y(k).

Up to this point, the memory 435 has been referred to as a read only memory (ROM). It is noted, however, that the memory does not necessarily need to be "read only." A random access memory, such as a SRAM or DRAM, would work equally well. The memory 435 could also be a programmable memory such as a PROM, EPROM, EEPROM, or flash memory, as examples. Other logic devices such as a programmable logic device (PLD) could also be used.

The interpolation circuit of the present invention has a number of advantages over other interpolation structures. For example, the latency and speed of the circuit is improved. The delay between changing the τ input and seeing the output Y(k) change is reduced because the interpolation requires fewer multipliers and adders and can hence generate a result quickly. In addition, the ROM complexity is significantly reduced allowing for faster operation. A small ROM, such as the 4-bit (16 locations) ROM described can often be implemented as random logic more efficiently.

The complexity of the system is also reduced because of the reduced number of multipliers and adders in the interpolation section. Since the multipliers (not shown) in the prefilter 300 (FIG. 3) are multiplying by constants and are therefore easier to implement. The lower complexity results in lower power and area in an integrated circuit implementation.

In particular, compared to the interpolator described in U.S. Pat. No. 5,760,984, the interpolator described here has a reduced number of prefilters and reduced ROM size. The interpolator of the '984 patent requires three prefilters each of which is distinct, that is, there is no symmetry or commonality between each of the three filters. In contrast, the preferred embodiment interpolator uses only two prefilters that have coefficients which are the reverse of each other. Alternatively, a single prefilter to shift by T/2 can be used.

Also in the '984 patent, the interpolator portion needs to store a set of coefficients for each interpolation point. For example, if 64 interpolation points are required, then 64 sets of coefficients must be stored. In contrast, the preferred embodiment of the present invention has reduced ROM size. In the preferred embodiment, for example, only sixteen sets of coefficients are stored for 64 interpolation points.

Other embodiments of the system can alternatively be implemented. For example, FIG. 3 illustrates a prefilter with the two filters 310 and 320 shifting by a time period of +T/4 and −T/4, respectively. These two filters could be replaced by a single filter shifting by T/2 to generate the two samples of the input signal per clock cycle. Further, the two filters 310 and 320 could be replaced by three (or more) filters to generate three (or more) samples per cycle and hence further simplify the interpolation section 400.

In another embodiment, the number of terms interpolated can be reduced to three (or less) to reduce the system complexity at the expense of some loss in accuracy. The number of terms interpolated can alternatively be increased to five (or more) to increase the accuracy of the system. Changing the number of terms would increase or decrease the number of multipliers and multiplexers as well as the size of the coefficient look up table.

The preferred embodiment showed sixty-four interpolation steps. As another variation, more or fewer interpolation steps can be readily implemented.

In addition, the sinc function with a hanning window has been used to implement the coefficients of the interpolator filters. Other window functions, however, can be used or, alternatively, the filter coefficients can be determined using a least mean squares fit based on the power spectrum of the signal being interpolated.

Figure 7:
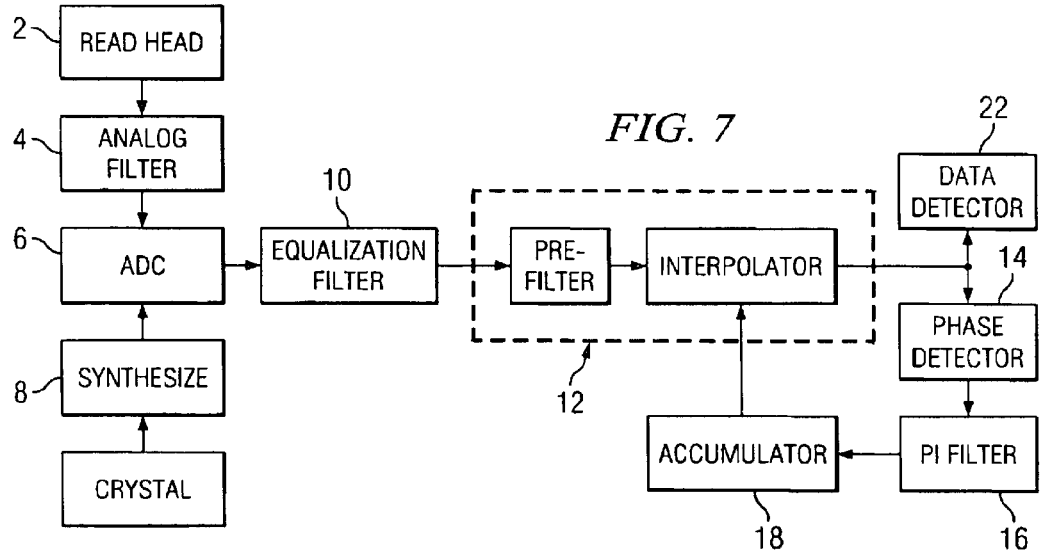
FIG. 7 is a block diagram of a read channel that utilizes an interpolator of the present invention.

FIG. 7 illustrates an example of a system that could utilize the interpolation scheme of the present invention. In the preferred embodiment, both the prefiltering and the reduced look up table are implemented. It is noted, however, that the system could implement either one without the other.

FIG. 7 illustrates a first preferred embodiment read channel. Information is stored on a storage medium, such as a magnetic disk (not shown) as a series of bit cells of varying magnetic polarity. A read/write coil 2 passes over the magnetic medium and converts the magnetic pulses into an analog electrical signal, as is well known in the art. This analog channel signal is filtered by analog filters 4 before being passed to analog to digital converter (ADC) 6.

ADC 6 samples the incoming signal at a sampling rate provided by sampling clock 8 and outputs a digital signal consisting of a sequence of channel samples. As illustrated, sampling clock 8 is preferably a crystal-driven synthesizer.

The digital signal from ADC 6 passes through equalization filter 10. As will be apparent to those skilled in the art, equalization filter 10 is preferably a Nyquist finite impulse response filter. The exact configuration of equalization filter 10 depends upon the partial response coding method employed. In the preferred embodiments, the information signal is encoded using the EPR4 standard and hence equalization filter 10 will shape the incoming digital signal and attempt to drive each channel sample to the appropriate one of the five levels employed in the EPR4 standard.

The signal is then passed to sample rate converter 12 which includes the pre-filter and interpolation circuit described above. Sample rate converter 12 derives the desired sample points by interpolating between channel samples. The interpolation interval is determined from a fractional delay value derived in accumulator 18, as will be described below.

From sample rate converter 12 the interpolated samples are output so that they can be accessed by data detector 22. Data detector 22 is preferable a Viterbi decoder. While not shown, the present invention could further include an elastic buffer as described in co-pending application Ser. No. 09/387,146.

As described above, sample rate converter 12 interpolates between channel samples to obtain the desired sample point. The location of the desired sample point, and hence the interpolation interval, relative to the channel samples depends upon the phase difference between the channel samples and the desired sampling points. The following discussion describes a preferred embodiment timing recovery loop for detecting the phase difference and generating therefrom a fractional delay value which is employed by the sample rate converter to set the interpolation interval.

As shown in FIG. 7, the output of sample rate converter 12 is also provided to the input of phase detector 14. Phase detector 14 operates to detect the phase difference between the sampled signal and an expected signal. The expected signal is a best estimate of what the sampled signal would look like if it had been sampled at the baud rate without any phase error.

Preferably, phase detector 14 contains a slicer circuit as is well known in the art. Each incoming sample passes through the slicer circuit where a value corresponding to the nearest EPR4 level is assigned to the sample. This EPR4 level value is the estimate of what the sample value would be in a case of no phase error. The output of the slicer is then compared to the actual sample value and a difference value is determined. A difference value signal is generated as successive samples are input to the phase detector.

As is known in the art, a phase error can be calculated from the slope of the difference value signal. In the preferred embodiments, a four bit phase error value provides sufficient resolution for efficient phase tracking and correction. This phase error signal is output from phase detector 14 and fed to PI filter 16.

PI filter 16 includes both a proportional filter and an integral filter. The proportional path simply provides a loop gain to the incoming error signal. The integral path integrates or averages the incoming error signal and applies a loop gain as well. The signals from both the proportional path and the integral path are added together and are output from PI filter 16. In this way, the timing recovery loop can compensate for a constant phase error, as would arise in the situation where the sampling clock matches the baud rate, but is slightly phase shifted, and can also compensate for a changing phase error, as would arise in an oversampling or undersampling condition.

Accumulator 18 receives as input the ten bit filtered phase error signal from PI filter 16 and outputs the fractional delay value τ. In the first preferred embodiment, accumulator 18 includes fourteen bit register and accumulates values of the filtered phase error signal received from PI filter 16. In other words, the ten bit phase error signal is fed to the ten LSB of the accumulator register and is counted up (added). The six most significant bits (MSB) of the accumulator register comprise the fraction delay value τ.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A circuit comprising:
a plurality of n multipliers, each multiplier having a first input and a second input, n being an integer greater than one;
a coefficient memory having at least n outputs, each output of the coefficient memory being coupled to a respective one of the multipliers at the first multiplier input;
a select circuit comprising a plurality of n multiplexers and having at least n output nodes, each of the n output nodes being coupled to a respective one of the multipliers at the second multiplier input, wherein each multiplexer includes first and second inputs and wherein each of the multiplexers are labeled as a first multiplexer, a second multiplexer and so on to an nth multiplexer; and
a plurality of input nodes coupled to the select circuit such that at a first time each of the input nodes is coupled to a respective one of the output nodes of the select circuit and such that at a second time at least some of the input nodes are coupled to a different one of the output nodes of the select circuit, wherein the input nodes are labeled as a first node, a second node and so on to an nth node, and wherein each input node is coupled to a corresponding first input of a respective one of the multiplexers such that the input nodes are coupled to the first input of the multiplexer in an forward order wherein the first input node is coupled to the first input of the first multiplexer, the second input node is coupled to the first input of the second multiplexer and the nth input node is coupled to the first input of the nth multiplexer and wherein each input node is also coupled to a corresponding second input of a respective one of the multiplexers such that the input modes are coupled to the second input of the multiplexers in a backward order wherein the first input node is coupled to the second input of the nth multiplexer, the second input node is coupled to the second input of the (n–1)th multiplexer and the nth input node is coupled to the second input of the first multiplexer.

2. The circuit of claim 1 wherein each of the multipliers further includes an output, each of the multiplier outputs being coupled to a summer.

3. The circuit of claim 1 wherein the coefficient memory comprises a ROM.

4. The circuit of claim 1 wherein the input nodes are coupled to a sequence of data pulses.

5. The circuit of claim 4 wherein the sequence of data pulses are provided by a second select circuit.

6. A data processing circuit comprising:
a digital data source having an output carrying a sequence of digital signals having a period;
pre-filter with an input coupled to the output of the digital data source, wherein a sequence of digital signals carried at the first output of the pre-filter is time-shifted relative to a sequence of digital signals carried at the second output of the pre-filter, the time-shift equal to about one half of the period of the sequence of digital signals,
an interpolation circuit with a first input coupled to a first output of the pre-filter and a second input coupled to a second output of the pre-filter, wherein the interpolation circuit includes:
a plurality on n multipliers, each multiplier having a first input and a second input, n being an integer greater than one; and
a select circuit having at least n output nodes, each of the at least n output nodes being coupled to a respective one of the plurality of n multipliers at the first input, the select circuit having at least n input nodes,
wherein the select circuit couples the at least n input nodes to the at least n output nodes in a first order if a magnitude of a time shift is less than a first fraction of the period and couples the at least n input nodes to the at least n output nodes in a second order if the magnitude of the time shift is greater than the first fraction of the period.

7. The circuit of claim 6 wherein the interpolation circuit further includes a first plurality of serially coupled delay circuits and a second plurality of serially coupled delay circuits, the first pre-filter output being coupled to a first delay circuit in the first plurality of serially coupled delay circuits and the second pre-filter output being coupled to a first delay circuit in the second plurality of serially coupled delay circuits.

8. The circuit of claim 7 wherein the interpolation circuit further includes a plurality of multiplexers, each multiplexer including a first input coupled to one of the delay circuits in the first plurality of delay circuits, each multiplexer also including a second input coupled to one of the delay circuits in the second plurality of delay circuits, each multiplexer also including an output.

9. The circuit of claim 6 wherein the interpolation circuit further comprises a coefficient memory having at least n outputs, each output of the coefficient memory being coupled to a respective one of the multipliers at the second multiplier input.

10. The circuit of claim 6 wherein the second order is the reverse of the first order.

11. A circuit comprising:
   a digital data source having an output carrying a sequence of digital signals;
   a plurality of delay elements receiving digital signals from the digital data source, the plurality of delay elements having a plurality of outputs, each output carrying a time-shifted version of an adjacent output;
   a selection circuit having a plurality of inputs coupled to the plurality of outputs of the delay elements, the selection circuit having a plurality of outputs that carry signals from the plurality of delay elements in a forward time order when a first state is selected and carry signals in a reverse time order when a second state is selected;
   a coefficient memory having a plurality of outputs; and
   a plurality of multipliers, each multiplier having a first input coupled to an output of the coefficient memory and a second input coupled to an output of the selection circuit.

12. The circuit of claim 11 wherein each of the multipliers further includes an output, each of the multiplier outputs being coupled to a summer.

13. The circuit of claim 11 and further comprising a pre-filter with an input coupled to the output of the digital data source, the pre-filter having a first output coupled an input of a first one of the plurality of delay elements.

14. The circuit of claim 11 wherein plurality of delay elements comprises a first plurality of serially coupled delay elements and a second plurality of serially coupled delay elements, the circuit further comprising a pre-filter coupled to receive the sequence of digital signals, the pre-filter comprising a first output coupled to an input of a first one of the first plurality of serially coupled delay elements and a second output coupled to a first one of the second plurality of serially coupled delay elements.

15. The circuit of claim 14 wherein a sequence of digital signals carried at the first output of the pre-filter is time-shifted relative to a sequence of digital signals carried at the second output of the pre-filter, the time-shift equal to about one half of the period of the sequence of digital signals.

16. An interpolation circuit comprising:
   an advance by T/4 filter;
   a delay by T/4 filter;
   a first register bank having an input coupled to an output of the advance by T/4 filter, the first register bank having a plurality of outputs;
   a second register bank having an input coupled to an output of the delay by T/4 filter, the second register bank having a plurality of outputs;
   a first select circuit with inputs coupled to the outputs of the first register bank and the outputs of the second register bank, the first select circuit having a plurality of outputs that carry signals derived from a selected subset of the outputs of the first register bank and the outputs of the second register bank;
   a second select circuit with inputs coupled to the outputs of the first select circuit, the second select circuit operable to reverse the order of signals provided at its inputs;
   a coefficient memory having a plurality of outputs; and
   a plurality of multipliers, each multiplier having a first input coupled to an output of the coefficient memory and a second input coupled to an output of the second select circuit.

* * * * *